UNITED STATES PATENT OFFICE.

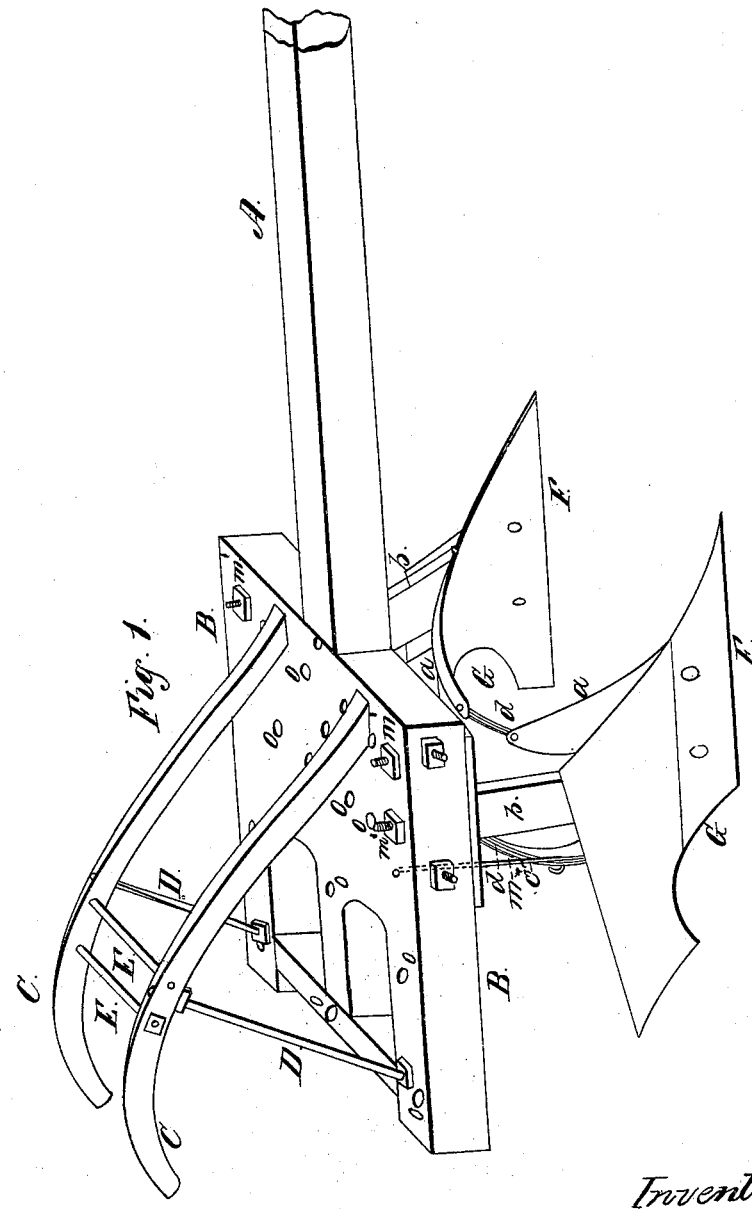
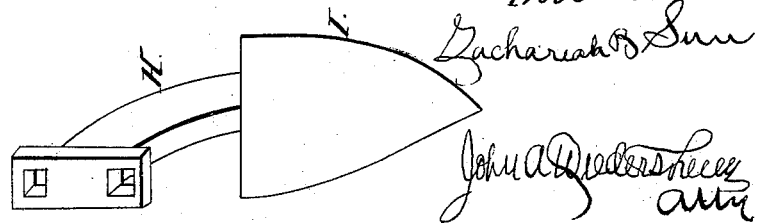

ZACHARIAH B. SIMS, OF BONHAM, TEXAS.

IMPROVEMENT IN COTTON-PLOWS.

Specification forming part of Letters Patent No. 94,350, dated August 31, 1869.

*To all whom it may concern:*

Be it known that I, ZACHARIAH B. SIMS, of Bonham, in the county of Fannin and State of Texas, have invented a new and useful Improvement in Cotton-Plows; and I do hereby declare the following to be a full, clear, and exact description of the same, sufficient to enable others skilled in the art to which my invention appertains to make and use the same, reference being had to the accompanying drawings, forming part of this specification, in which—

Figure 1 is a perspective view of the device illustrating my invention. Fig. 2 is a perspective view of one of the plows.

Similar letters of reference indicate corresponding parts in the several figures.

This invention relates to certain improvements in cotton or other plows, hereinafter more fully set forth.

In the accompanying drawings, A is the plow-beam. B is the frame, having the holes o o o made in it, into which the small ends of the shanks b b are made to pass, and which are secured in position by the nuts m' m'. The object of this arrangement of parts is to adjust the plows F F nearer or farther apart, or to adjust them from front to rear in the frame B.

D D are braces connected with the handles C C, by which the height of the handles can be regulated to suit the height of the plowman.

E E are braces connecting the handles.

The construction of the frame and adjustments are fully set forth in application A, filed by me in the United States Patent Office, May 24, 1869, and as such construction forms no part of this invention it is only deemed necessary to refer to it in a general manner.

F F are the plows attached to the shanks b b, and having curved pieces G G cut out from near their rear ends, as shown in Fig. 1. The object of cutting out the curved pieces G G from the mold-board is to prevent the plow from clogging, particularly in stiff land, the surface of the mold-board being shorter in cross-section when the curved pieces are cut out than in the ordinary mold-board, while as wide and deep a furrow can be made.

a a are curved flanges, bolted or otherwise attached to the inner sides of the plow. To the upper ends of the curved flanges a a is secured an arched protector, d, provided at its rear end with flanges c c, inclined toward the rear of the plow. The rear end of the protector d is supported by rods m m, connected with plow-frame B.

I, Fig. 2, is a plow-tooth attached to the middle and rear end of the frame, and is designed to be employed in working between the cotton-rows, the curved flanges a a and protector d being removed in the operation. The plow, with the curved flanges and protector attached, is intended to be employed when the cotton or other plant is small, the curved flanges running near and straddling the plant and removing all grass from about it, while the protector d is situated directly over the plant. The dirt will thus be somewhat arched and thrown near to the plant. Any filth passing over the outer surfaces of the curved flanges will pass on to the curved protector, which prevents it falling on the plant, and will pass off over the sides of the protector.

Having thus described my invention, what I claim as new, and desire to secure by Letters Patent, is—

1. The curved flanges a a, in combination with the plows F F, all constructed and operated as described.

2. The flanged protector d, in combination with the curved flanges a a, as and for the purpose set forth.

3. The plows F F, in combination with the curved flanges a a and protector d, as and for the purpose set forth.

4. The plow-tooth I, in combination with the plows F F, all constructed, arranged, and operated in the manner and for the purpose set forth.

ZACHARIAH B. SIMS.

Witnesses:
JOHN A. WIEDERSHEIM,
PHIL. F. LARNER.